United States Patent [19]
Servan-Schreiber

[11] Patent Number: 5,973,691
[45] Date of Patent: Oct. 26, 1999

[54] DISPLAY OF MULTIPLE IMAGES BASED ON A TEMPORAL RELATIONSHIP AMONG THEM WITH VARIOUS OPERATIONS AVAILABLE TO A USER AS A FUNCTION OF EACH DISPLAYED IMAGE SIZE

[75] Inventor: Franklin Servan-Schreiber, New York, N.Y.

[73] Assignees: Sony Corporation, Tokyo, Japan; Sony Electronics, Inc., Park Ridge, N.J.

[21] Appl. No.: 08/841,668

[22] Filed: Apr. 30, 1997

[51] Int. Cl.$^6$ ....................................................... G06F 3/14
[52] U.S. Cl. ........................... 345/342; 345/343; 345/345
[58] Field of Search .................................. 345/334, 340, 345/342, 343, 344, 345, 348

[56] References Cited

U.S. PATENT DOCUMENTS

| | | | |
|---|---|---|---|
| 5,001,697 | 3/1991 | Torres | 345/439 |
| 5,179,655 | 1/1993 | Noguchi et al. | 345/345 |
| 5,237,653 | 8/1993 | Noguchi et al. | 345/345 |
| 5,390,295 | 2/1995 | Bates et al. | 345/342 |
| 5,428,736 | 6/1995 | Kahl et al. | 345/342 |
| 5,491,795 | 2/1996 | Beaudet et al. | 345/346 |

*Primary Examiner*—Raymond J. Bayerl
*Assistant Examiner*—Chadwick A. Jackson
*Attorney, Agent, or Firm*—Frommer Lawrence & Haug, LLP.; William S. Frommer

[57] ABSTRACT

Multiple images are displayed on a screen of a computer system to reflect a temporal relationship among them. Based on date and time when an image is obtained in relation to other displayed images, its size is set accordingly. Namely, the more recent the image, the larger its size on the screen. In addition, the larger the size of the image, the more processing operations, including graphical or text processing functions, are available to a user to be performed on that image.

13 Claims, 10 Drawing Sheets

DISPLAY OF MULTIPLE IMAGES BASED ON A TEMPORAL RELATIONSHIP AMONG THEM WITH VARIOUS OPERATIONS AVAILABLE TO A USER AS A FUNCTION OF EACH DISPLAYED IMAGE SIZE

BACKGROUND OF THE INVENTION

The invention is related to a Graphical User Interface (GUI) and, in particular, a method for displaying on a computer screen images which are temporally related to each other, indicating the temporal relationship among them, while optionally supplying the displayed images with various levels of functionality based on their displayed size.

As well known in the art, a Graphical User Interface allows a user of a computer system to view, manipulate, etc. images on a screen in a simple and user-friendly manner. The displayed images may be graphical or textual. As complexity and functionality of computer systems increase, however, the limited display area of the computer screen becomes a highly valuable "commodity." Clearly, the display area must be utilized wisely to accommodate the increased system complexity, as correctly pointed out in the U.S. Pat. No. 5,341,466 to Perlin et al, for example.

In particular, simultaneous display of multiple images on a screen presents somewhat conflicting interests between programmers and users. While the programmers would like to utilize the full capability of the system, which may be quite complex requiring several images to be shown on the screen, they are constrained by the users' desire to have simple and "user-friendly" displays. Understandably, users do not want to be overburdened with a hard-to-understand display even if it offers increased system functionality.

Undoubtedly, the currently popular windows environment provides the vehicle to partially reconcile those conflicting interests. A multiple image display with various functionalities is accomplished on one screen without sacrificing the "user-friendliness" of the system. Users have immediate access to several applications, for example, and can switch between them with ease and simplicity.

Nevertheless, the display of temporally-related windows is currently deficient in several aspects. Namely, the display of those windows created, i.e., "opened", prior to the currently active open window is substantially hidden from view, appearing stacked behind the current window. Alternatively, multiple windows may be fully visible to a viewer, i.e., occupying substantially the same or smaller display areas on the screen for example, but fail to indicate to the viewer the existence of a temporal relationship between them.

OBJECTS OF THE INVENTION

It is an object of the present invention to provide a display of multiple images such that a temporal relationship among the displayed images is clearly visible to a viewer.

It is another object of the present invention to provide a display of multiple images having various sizes as a function of date and time of creation of each displayed image, such that the temporal relationship among the images in the displayed windows is clearly visible to a viewer.

It is a further object of the present invention to provide a display of multiple pages in a document, such that the displayed pages are shown in increasingly smaller sizes as the date and time of creation of each displayed page becomes further removed in time from the most recently created page having the largest image display on the screen.

It is still another object of the present invention to provide a display of multiple images having different functions or operations available to a user based on the size of the displayed window image.

It is yet a further object of the present invention to provide a display of multiple pages in a document, such that when the displayed image is increased or reduced in size, its functionality, i.e., the displayed image operations available to a user, increases or decreases, correspondingly.

It is yet another object of the invention to provide a display of multiple pages in a document, such that a page having a smaller display size has less functions available to a user than a page with a larger display size.

SUMMARY OF THE INVENTION

These and other objects, features and advantages are accomplished by a method and system for displaying windows in a window environment under user control. Displayed on a screen is a window in which the user can perform various processing operations including a graphical or text processing function on an image displayed within that window. The size of the window is then changed as desired by the user, wherein the number of processing operations available to the user depends upon the window size.

In accordance with one aspect of the present invention, a fewer number of processing operations is available to the user when the window size is smaller than when the window size is larger.

In accordance with another aspect of the present invention, making the window size larger on the screen does not increase the number of processing operations available in the window if the number of processing operations has reached a maximum value.

In accordance with yet another aspect of the present invention, making the window size smaller on the screen does not reduce the number of processing operations available in the window if the number of processing operations has reached a minimum value.

BRIEF DESCRIPTION OF THE DRAWINGS

The above-mentioned as well as additional objects, features and advantages of the invention will become readily apparent from the following detailed description thereof which is to be read in conjunction with the accompanying drawings, in which.

In all Figures, like reference numerals represent the same or identical components of the present invention.

DETAILED DESCRIPTION OF THE PREFERRED EMBODIMENTS

The invention will now be explained in detail with reference to the accompanying drawings.

Figure 1:
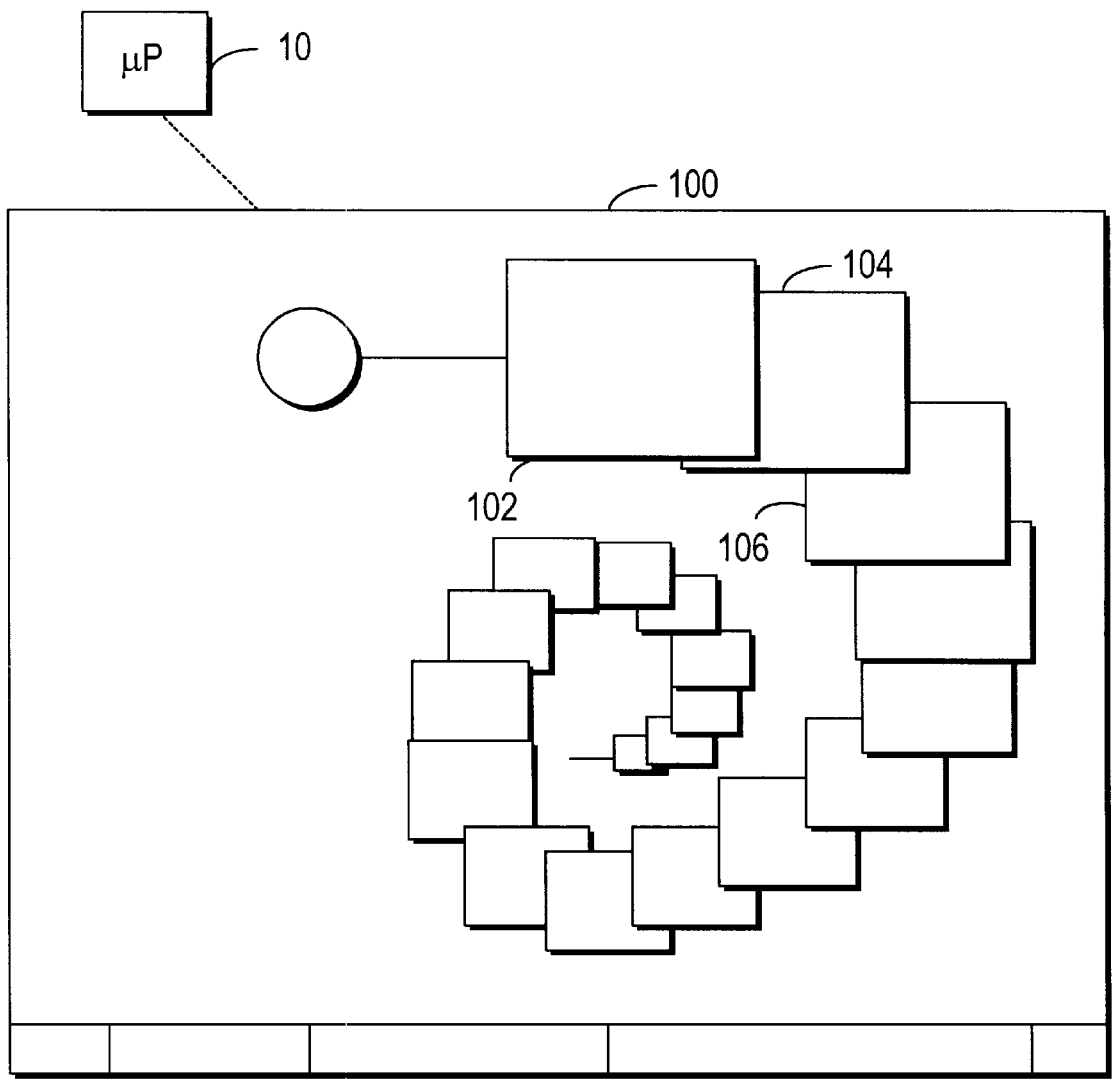
FIG. 1 is a computer screen display of multiple, various-sized images arranged in a spiral chain to indicate a temporal relationship among them according to one embodiment of the present invention.

FIG. 1 shows a computer screen display of multiple, various-sized images according to the present invention. The images are arranged in a spiral chain on screen 100 to indicate a temporal relationship among them. Namely, image 102 has the largest display size and is the most recent image, as indicated by its display size on the screen 100. Image 104 is the next most recent image, as indicated by its size being smaller than the image 102. similarly, image 106 is less recent than the image 104, and the size of each additional image in FIG. 1 is displayed according to its temporal relationship to other images.

When a user desires to view a new image on the screen 100, that image will be sized according to its date and time of creation, for example, and will occupy its appropriate position within the spiral chain. That is, if the most recent image is added to the display, that new image takes on the size of the image 102. The image 102, in turn, becomes the size of the image 104, which is decreased to the size of the image 106. In other words, with the addition of the new image, all images are re-sized accordingly to indicate the proper temporal relationship among them.

The definition of "the most recent" may include date and time of creation of a page in a document, as assumed in the preceding discussion for example. That is, let it be assumed a user creates a multi-page document using word-processing software, for example, and then wishes to review all or several pages of that document on the screen. In accordance with the present invention, the pages of the document are displayed on the screen in various sizes according to the date and time of creation of each page. The more recent the page in the document, the larger it appears on the screen.

Alternatively, the images may be arranged according to the time the user retrieved them from a database or the Internet, for example. In particular, the user may obtain several textual images, i.e., documents, from a commercial on-line content provider and he/she then may obtain several images from the Internet which are related to the retrieved text. When viewing all of the obtained images related to the particular subject, for example, the user arranges the images on the screen according to their time of retrieval, i.e., the textual images retrieved prior to the graphical images. As shown, for example, in FIG. 2, textual image 202 appears smaller than graphical image 204 on screen 200 in accordance with the present invention. In addition, all of the displayed images are located on the web spiral chain 206, which also points out the sequencing relationship among the displayed images.

Figure 2:
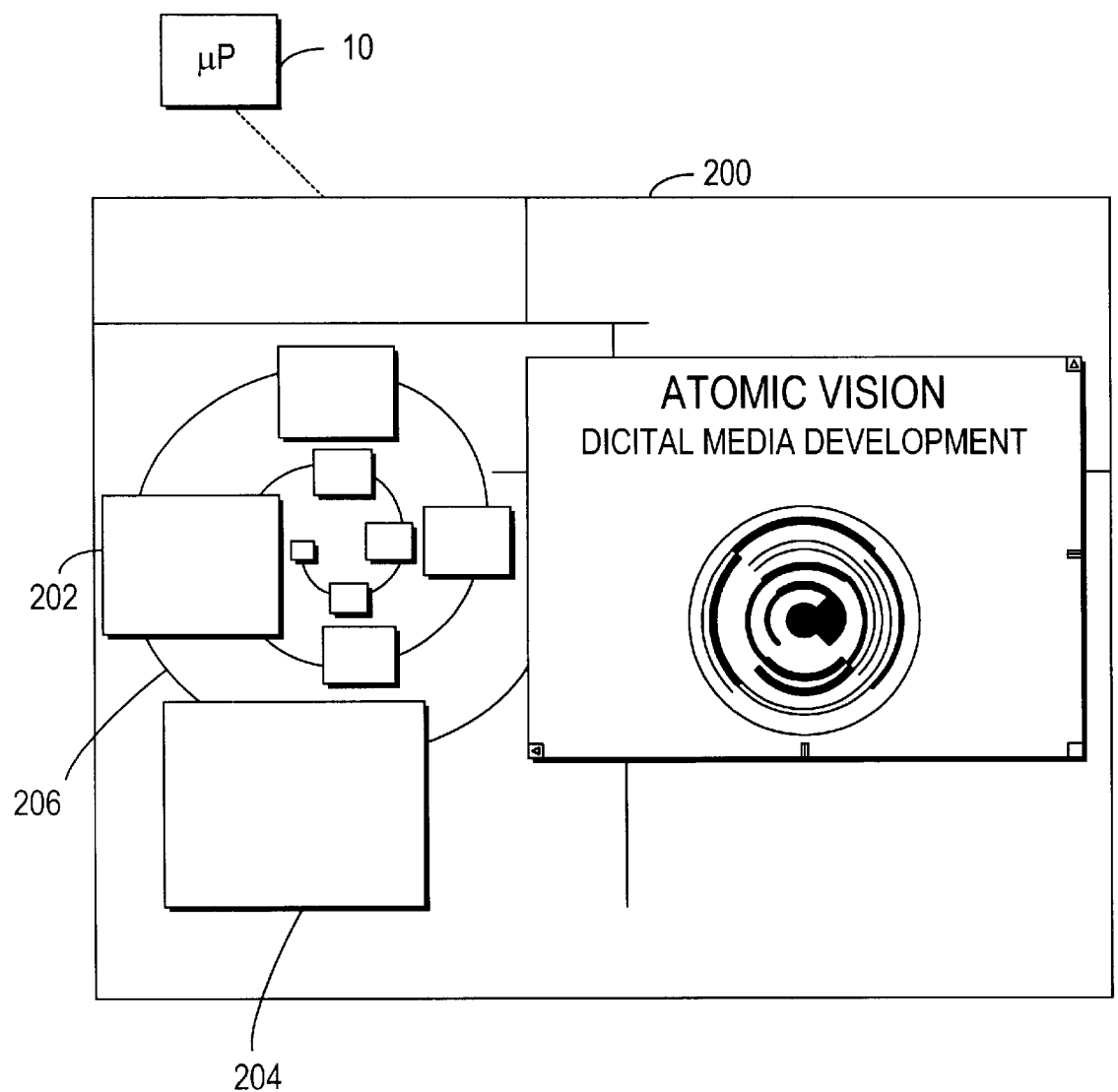
FIG. 2 is a computer screen display of multiple, various-sized images arranged in a web spiral chain to indicate a temporal relationship among them according to another embodiment of the present invention.

While the displayed images of different sizes in FIG. 1 are shown overlapping each other, FIG. 2 additionally shows another embodiment of the present invention comprising a computer screen display of multiple, various-sized images arranged in a web spiral chain. In FIG. 2, the web spiral chain indicates a temporal relationship among the displayed images without any screen display area overlap. It is understood, of course, that the spiral chain arrangement in FIG. 1 may include a display of images of various sizes spaced apart from each other such that each image is fully visible to the user.

Figure 3:
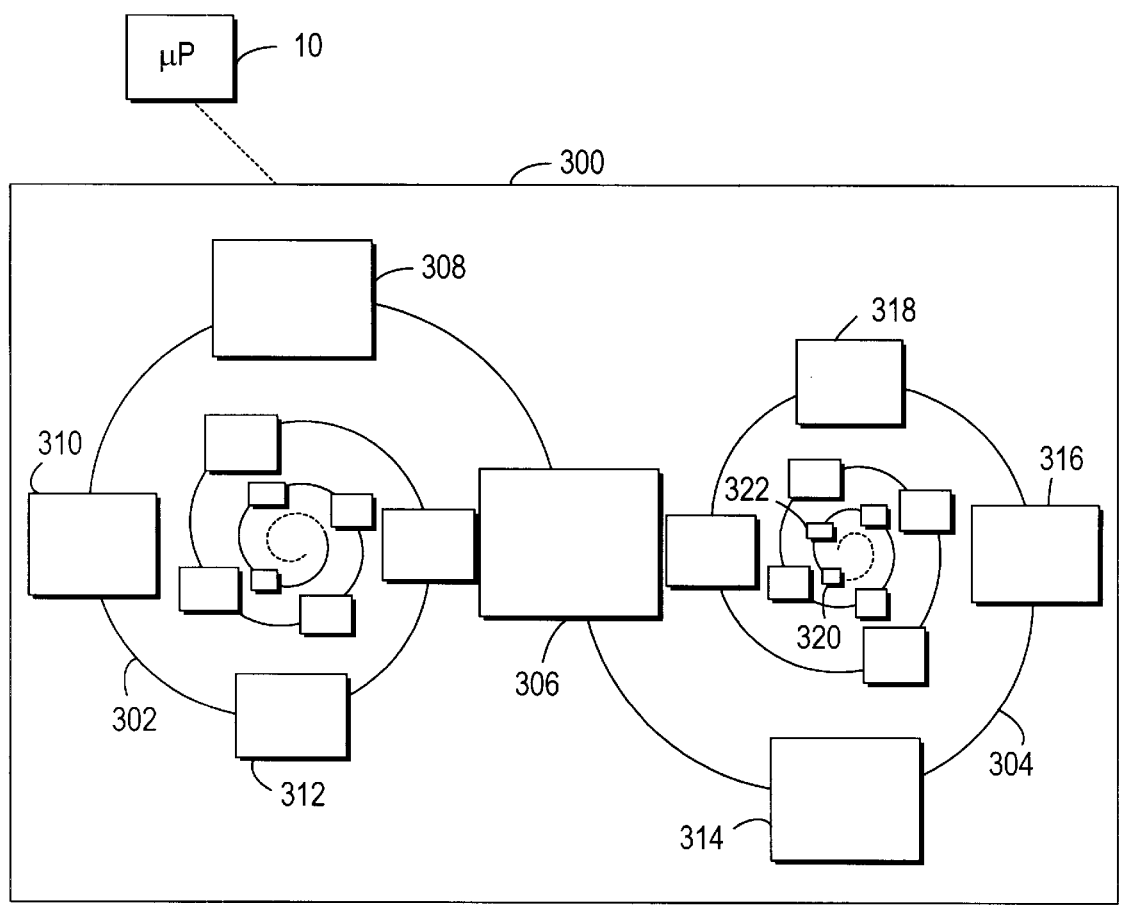
FIG. 3 is a computer screen display of multiple, various-sized images arranged as two spiral chains connected to each other to indicate a temporal relationship among the displayed images according to yet another embodiment of the present invention.

FIG. 3 shows yet another embodiment of the present invention. FIG. 3 is a computer screen display of multiple, various-sized images arranged as two web spiral chains connected to each other. As in the embodiments described above, the display size of the image indicates a temporal relationship among all of the displayed images on screen 300. Two web spiral chains 302 and 304 are joined by image 306 on which the user currently performs some operation, for example. Those images located on the web spiral chain 302, such as 308, 310, 312, etc., have been created prior to the creation of the image 306. Images 314, 316, 318, etc. located on the web spiral chain 304 have been created subsequently to the image 306.

As shown in FIG. 3, those images on the web spiral chain 302 are displayed in such a manner that the most recent (current) image on that chain is the largest, while the other images on that chain decrease in size depending on their date/time of creation, retrieval, etc. This is in accordance with the above examples described with reference to FIGS. 1 and 2. The web spiral chain 304, however, has a reciprocal arrangement with that of the web spiral chain 302: the least recent (least current) image is the largest in size, while the remaining images on the web spiral chain 304 decrease in size as their date/time of creation, retrieval, etc. by the user becomes more recent or current. That is, the most recent (current) image on the web spiral chain 304 is image 320, the next most recent (current) is image 322, etc. It is understood, of course, that this "reverse" display of temporal relationship among the images located on the web spiral chain 304 may also be used in the examples of FIGS. 1 and 2 as described above.

Figure 4:
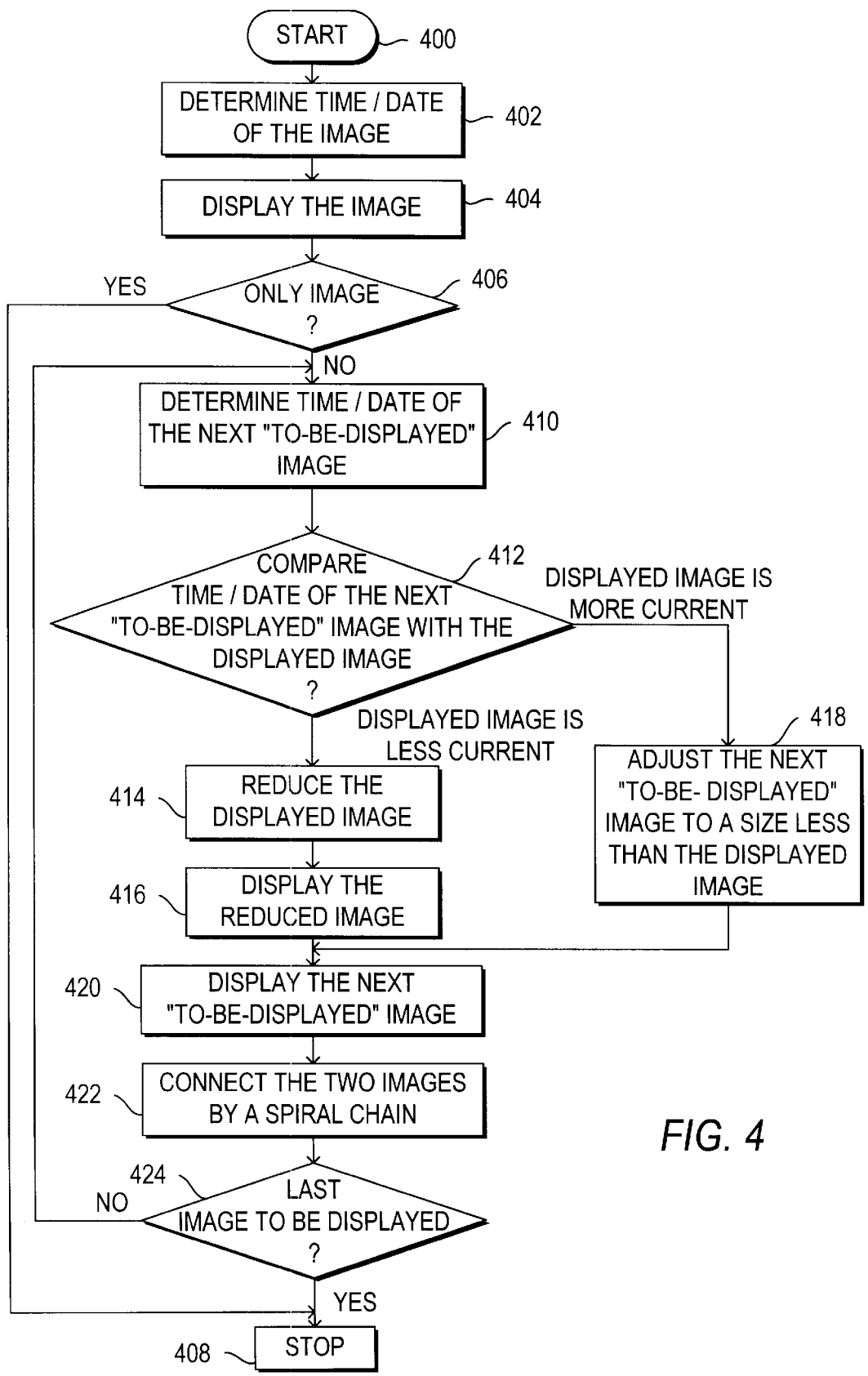
FIG. 4 is a sequencing flowchart for displaying temporally-related images in accordance with one aspect of the present invention.

FIG. 4 is a sequencing flowchart for operating a processor to display temporally-related images in accordance with one embodiment of the present invention. Following the start operation in step 400, it is determined in step 402 how "current" the displayed image is. As stated above, the point of reference may be date/time of image creation, date/time of image retrieval into the system, etc. The image is then displayed on the screen in step 404 according to a predetermined size for the first displayed image.

A decision is then made in step 406 whether this is the only image that the user wishes to view on the screen. If so, the operation is terminated as indicated by step 408. Otherwise, i.e., this is not the only image to be displayed, it is determined in step 410 how "current" the next image to be displayed is. A comparison is then carried out in step 412 to determine whether the next "to-be-displayed" image is more current than the displayed image. If so, the size of the displayed image is reduced in step 414, and the reduced displayed image appears on the screen in step 416. If, on the other hand, the next "to-be-displayed" image is less current than the displayed image, then dimensions of the next "to-be-displayed" image are adjusted in step 418 in accordance with a predetermined size which is less than the displayed image size.

The process then continues with step 420 where the next "to-be-displayed" image is displayed on the screen, either larger or smaller than the previous image based on how current it is as described above. In step 422, the two displayed images on the screen are connected to each other by a web spiral chain or an ordinary spiral chain.

Next, a decision is made in step 424 to determine whether there are more images to be displayed on the screen. If so, the process is stopped in step 408. Otherwise, the display of the next image continues with step 410 and subsequent steps as described above.

Figure 5:
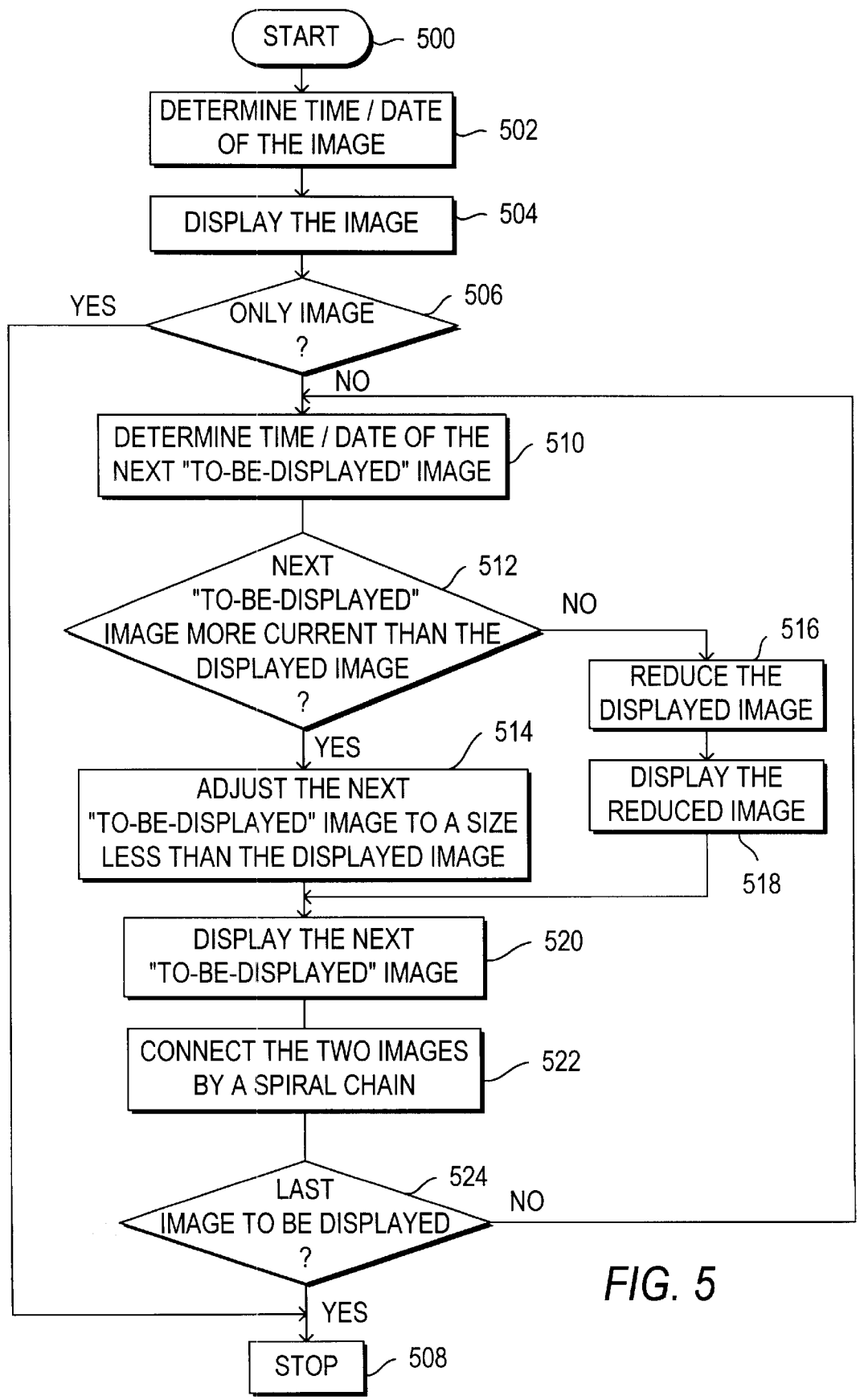
FIG. 5 is a sequencing flowchart for displaying temporally-related images in accordance with another aspect of the present invention.

FIG. 5 is a sequencing flowchart representing the operation of a processor to display temporally-related images in accordance with another aspect of the present invention and, in particular, the "reverse" arrangement as represented by the web spiral chain 304. The flowchart of FIG. 5 is partly similar to the flowchart of FIG. 4 and since steps 400, 402, 404, 406, 408, 410, 420, 422 and 424 fully correspond to steps 500, 502, 504, 506, 508, 510, 520, 522 and 524 respectively, their description will be omitted for the sake of clarity. Only those steps in FIG. 5 which differ from steps in FIG. 4 will be described next.

Hence, starting with the description of step 512 in FIG. 5, if it is determined that the next "to-be-displayed" image is more current than the displayed image, the size of the next "to-bedisplayed" image is made in step 514 to conform to a predetermined size which is less than the displayed image size. If, on the other hand, the next "to-be-displayed" image is less current than the displayed image, then the displayed image is reduced in step 516, and the reduced displayed image appears on the screen in step 518. The process then continues as described above with reference to FIG. 4.

Figure 6A:
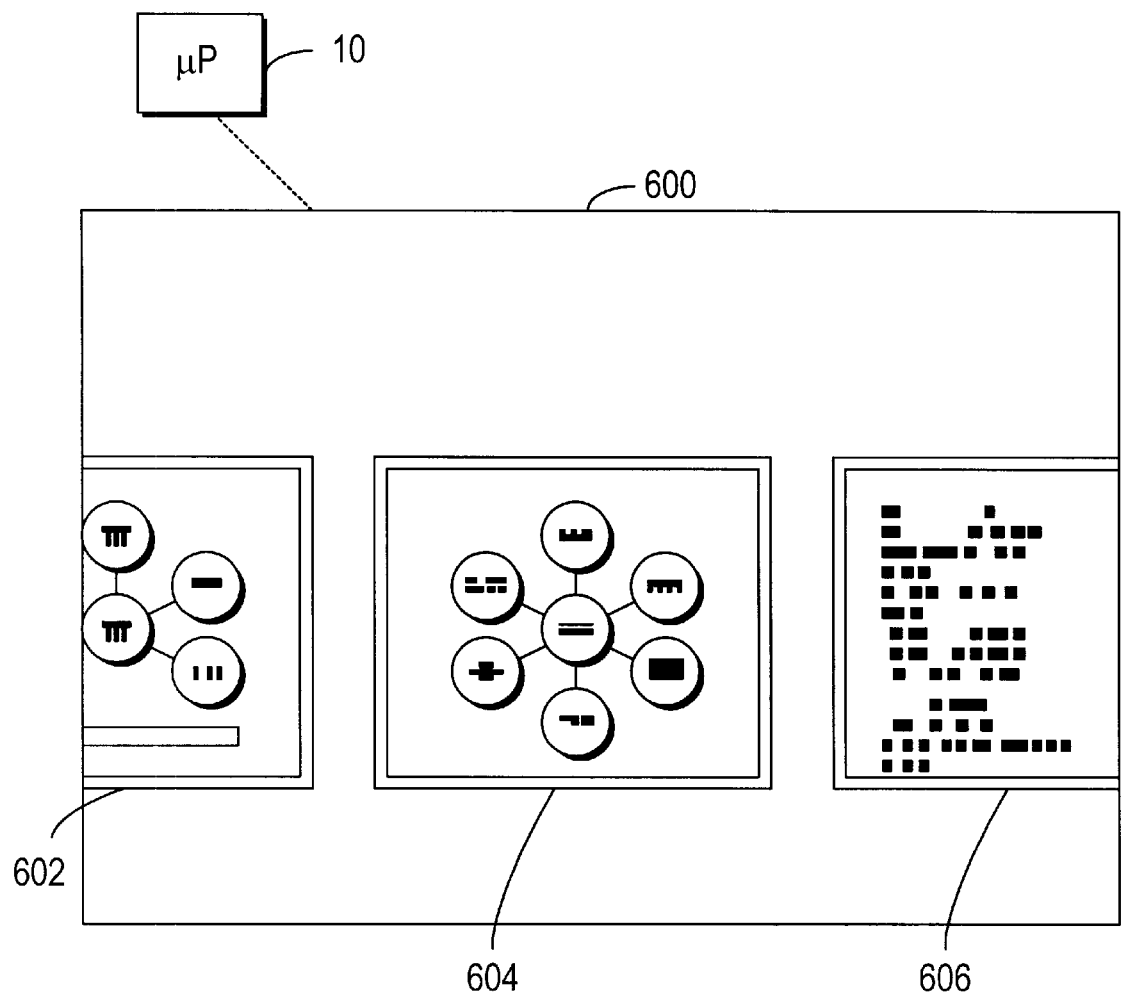
FIG. 6A is a computer screen display of an image having a predetermined number of operations available to be performed on that image as a function of the image display size according to one aspect of the present invention.
Figure 6B:
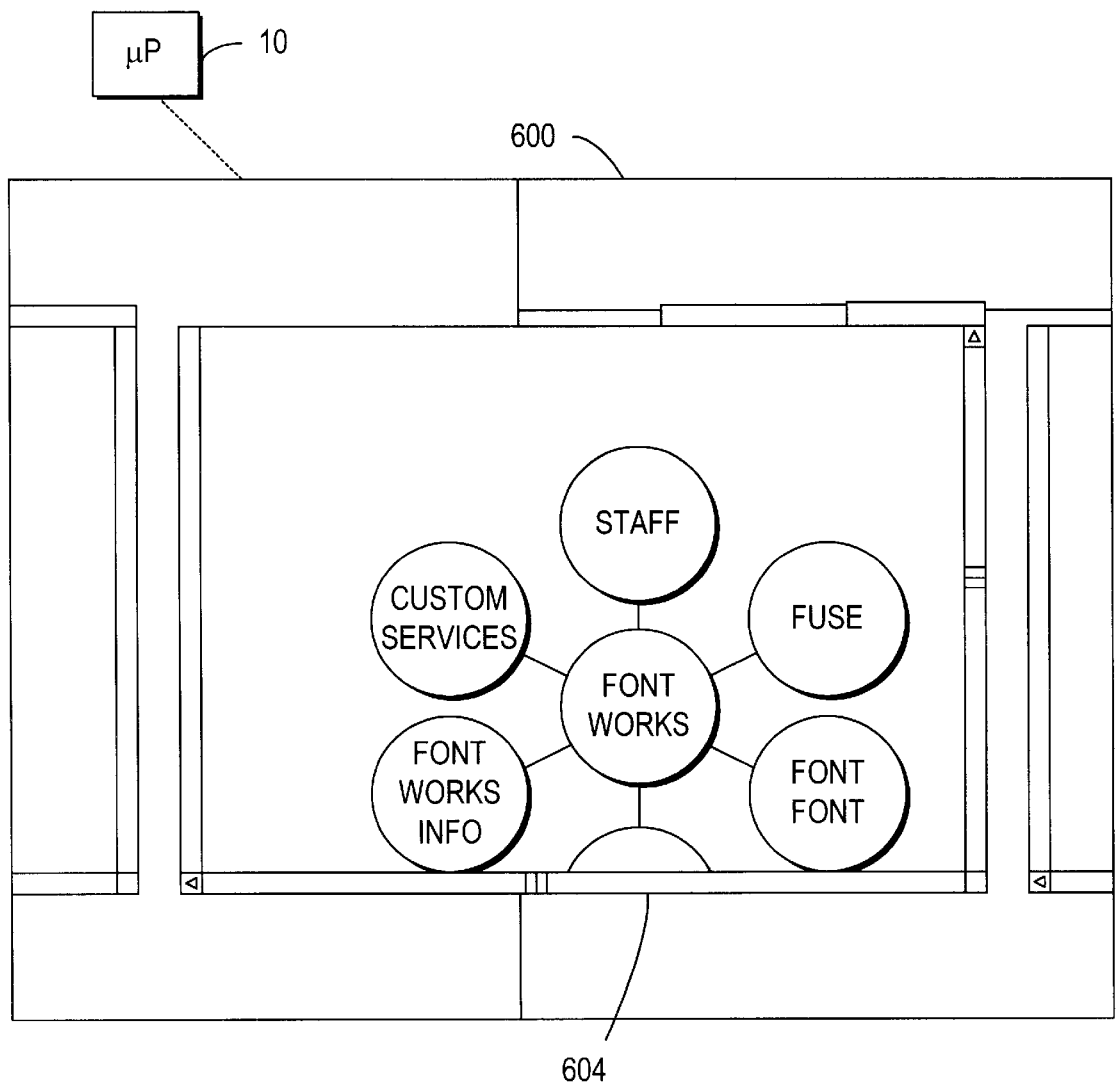
FIG. 6B is a computer screen display of the image of FIG. 6A increased in size and having a larger number of operations available than in FIG. 6A.
Figure 6C:
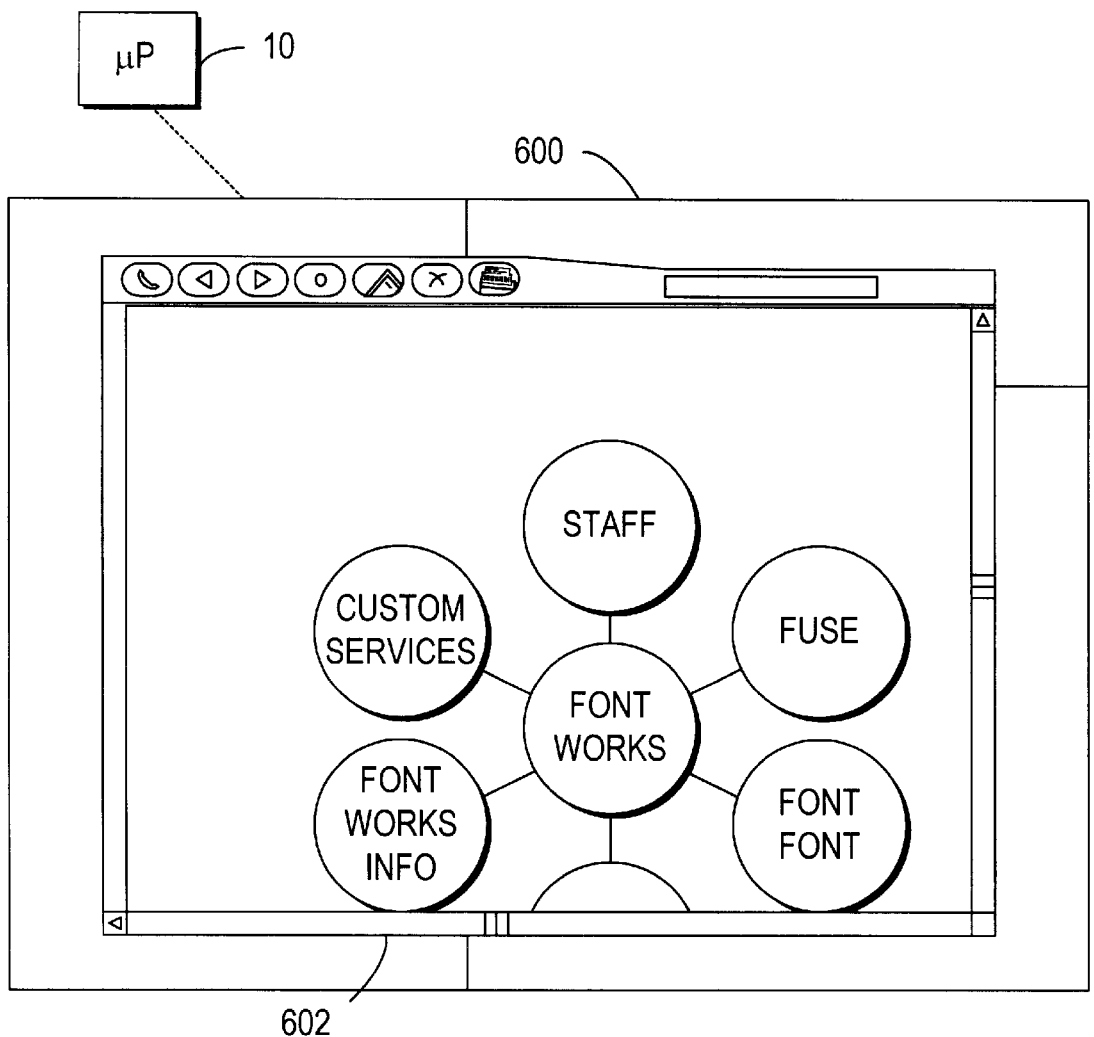
FIG. 6C is a computer screen display of the image of FIG. 6B further increased in size and having even larger number of operations available than in FIG. 6B.

FIGS. 6A, 6B and 6C further show an aspect of the present invention to provide a more user-friendly display and to improve a memory management capability in the computer system. In particular, FIG. 6A is a computer screen display of several images. Only part of image 602 appears on screen 600, while entire image 604 and substantially entire image 606 are displayed as shown in the figure.

In accordance with one aspect of the present invention, only certain functions (operations) are available to the user at this particular image scale, i.e., at this size, because the scale is relatively small. That is, the user can, for example, select an object in the image 604, move or change the size of that object, or copy or delete it. Other more detailed operations dealing, for example, with the contents of the object, are unavailable to the user due to the small image scale on the display screen. Referring to the above example, with multiple pages in the document created by using word processing software, at this scale the user may be permitted to use only selected operations of the word processing software: to indent paragraphs, to justify text by specifying the line alignment with respect to left and right margins, to convert upper/lower case letters, as well as other large-scale functions. This is so because individual words or letters cannot be recognized by the user due to the small image scale, as stated above.

FIG. 6B shows a computer screen display of image 604 increased in size. Namely, by selecting via a cursor and "clicking" on the image 604 in FIG. 6A using a conventional input device, such as a mouse, the image 604 is increased in size. Since the user can now view more of the contents of each object due to this larger scale, more operations become available than in FIG. 6A.

For example, image functionality at this scale may include editing of the object's title, changing graphical images within the object, etc. In a multiple page document created with word processing software, the user may scroll through the text, cut, copy and paste paragraphs, etc.

FIG. 6C is the next computer screen display of the image 604 further increased in size and having an even larger number of operations available to it than in FIG. 6B. Full scale image functionality, for example, may become available to the user since the image 604 now occupies substantially the entire display area of the screen.

Figure 7:
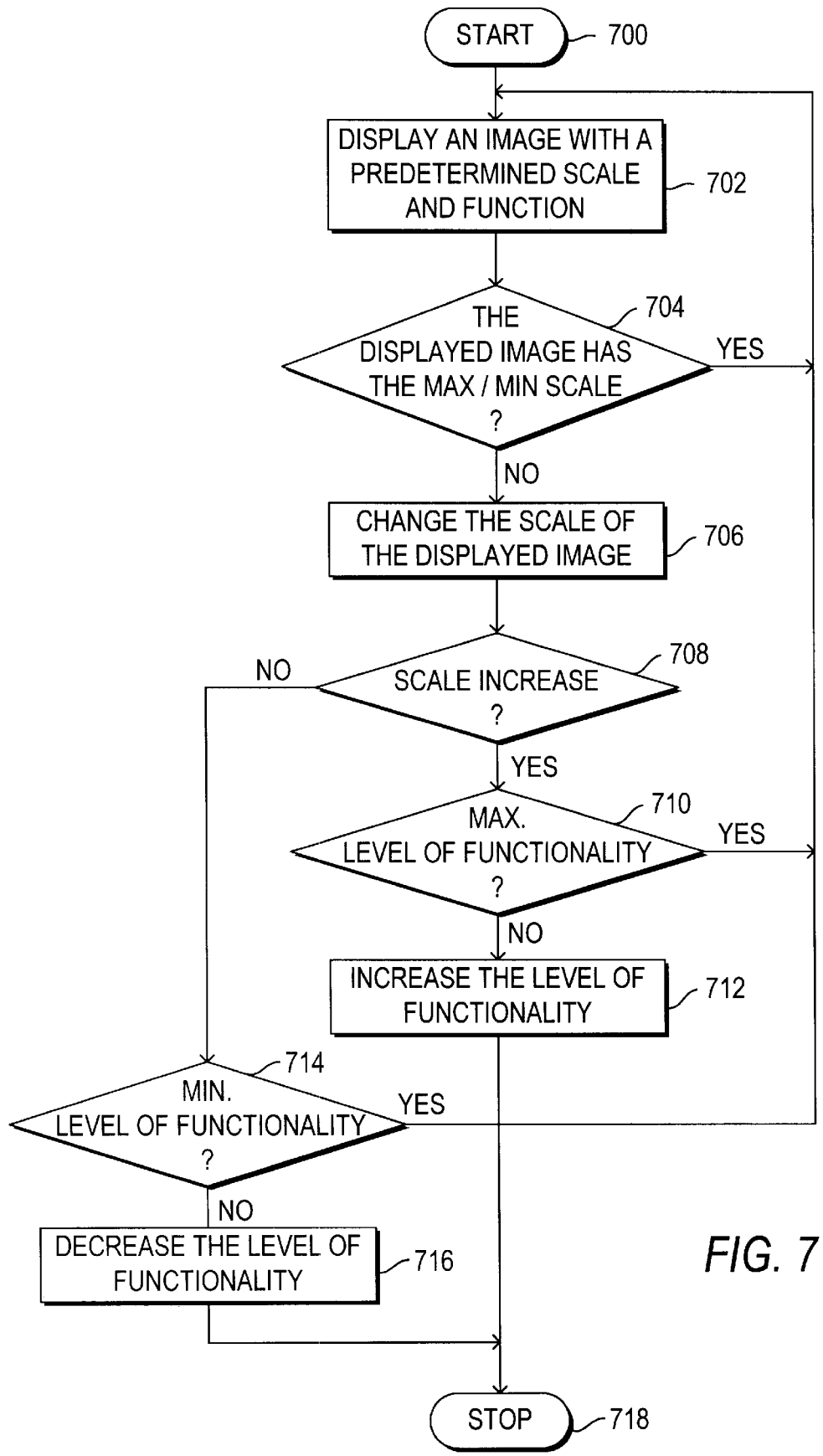
FIG. 7 is a sequencing flowchart for displaying computer screen images having various functionalities as a function of their display size in accordance with one aspect of the present invention.

FIG. 7 is a sequencing flowchart representing the operation of a processor to display the images having various functionalities as a function of their display sizes, in accordance with one aspect of the present invention. After the start in step 700, an image is displayed with a predetermined scale and predetermined manipulable function in step 702. A decision is then made in step 704 whether the displayed image has the maximum or minimum scale as defined by the system and screen display area. If so, the process returns to the display of that image in step 702 without any further operation. If, however, the displayed image is not at the maximum or minimum scale, the image scale is changed in step 706, i.e., decreased or increased according to the user input, temporal relationship of the image with respect to other images, etc.

Next, a decision is made in step 708 whether the image scale has been increased. If so, another decision is made in step 710 whether the maximum level of functionality has been reached at this image scale. If the answer is negative, the level of functionality is increased in step 712 making more operations pertaining to that displayed image available to the user. The process is then stopped in step 718. Otherwise, that is, if the image has the maximum level of functionality allowed by the system, the process returns to step 702 to display the increased image without any change in the image functionality.

If in step 708, it is decided that the image has been decreased in step 706, another decision is carried out in step 714 to determine whether the image has the minimum level of functionality. If so, the process returns to step 702 and displays the decreased image without any modifications to its level of functionality. Otherwise, that is, if the image is not associated with the minimum level of functionality, the level of functionality is decreased in step 716 making less operations available to the user with respect to that particular image display.

Figure 8:
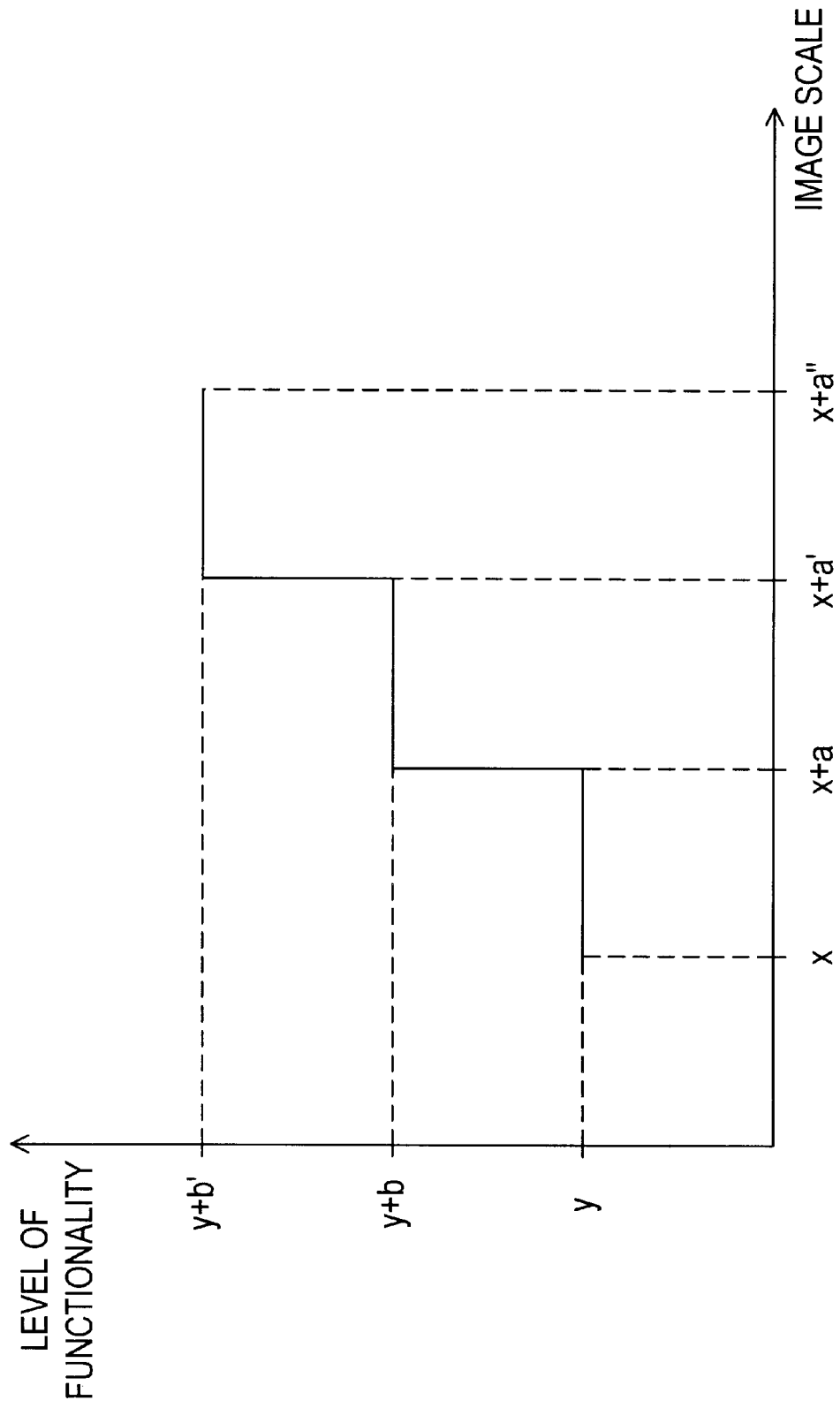
FIG. 8 is a graph illustrating the process of scalable functionality as described with reference to FIG. 7.

FIG. 8 is a graph illustrating the process of scalable functionality as described with reference to FIG. 7. As shown in FIG. 8, the x-axis represents the displayed image scale while the y-axis represents the level of functionality for the displayed image. When the image scale increases from x to x+a, the level of functionality also increases from y to y+b. If the next predetermined scale for the image display is reached, the level of functionality increases correspondingly. Similarly, when the image is scaled down, the number of operations available to the user to perform on that image, i.e., the level of functionality, decreases to the adjacent lower level, if any.

By further observing the graph of FIG. 8, it is worth noting that both the scale and functionality have minimum and maximum levels as defined by the system and/or system programmers. Furthermore, both the scale and level of functionality are not continuous but discrete: the level of functionality does not change from the previous level until the scale reaches the next predetermined value to effect the image change if allowed.

The scalable image functionality can be optionally activated with the spiral display of temporally related images described above. Based on the image size indicating how recent (current) the image is, the number of word processing operations may change as, for example, when the user views a multiple page document on the screen and performs various operations on the contents of individual pages.

It is also worth noting that the scaled image functionality improves the system memory management. Namely, those functions which are not relevant to the particular image scale do not have to be loaded into the system memory. This is in contrast to conventional image displays where all functions are pre-loaded into system memory, even though many functions are useless at all image scales except the full scale. Hence, the system memory is unnecessarily wasted in conventional image displays.

FIGS. 1–3 and 6A–6C show the respective display screens under the control of microprocessor 10. It will be appreciated that the microprocessor 10 or any other programmable controller may be programmed to effect the operations of the present invention as described above with reference to those figures and in accordance with the flow-charts of FIGS. 4, 5 and 7.

Having described specific preferred embodiments of the invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A method for displaying a plurality of images on a screen in a window environment of a computer system under user control, said images being stored in said computer system, comprising the steps of:

determining a temporal order of each image according to creation or retrieval of said each image by said computer system;

displaying said plurality of images in said temporal order by arraying the displayed images along a line such that the sizes of the displayed images progressively chance along said line in accordance with said temporal order, each of said images having a predetermined size and being manipulable by a predetermined number of processing operations including a graphical or text processing function available to said user to be performed on respective images;

determining those processing operations that are made available to said user based on the size of each of said images; and providing said processing operations for use by said user in correspondence with the size of each of said images, wherein a first image in said plurality of images has less processing operations than a second image in said plurality, said second image having larger size than said first image.

2. The method according to claim 1, further comprising changing said predetermined size of said first image such that the number of processing operations available to be performed on said first image changes in correspondence with the size change.

3. The method according to claim 1, further comprising making said first image size larger such that the number of processing operations available to be performed on said first image is increased in correspondence with the increase in said first image size.

4. The method according to claim 3, wherein making said first image size larger does not increase the number of processing operations available to be performed on said first image if the number of processing operations has reached a maximum value.

5. The method according to claim 1, further comprising making said first image size smaller such that the number of processing operations available to be performed on said first image is reduced in correspondence with the decrease in said first image size.

6. The method according to claim 5, wherein making said first image size smaller does not reduce the number of processing operations available to be performed on said first image if the number of processing operations has reached a minimum value.

7. The method according to claim 1, wherein said second image is displayed on said screen after said first image.

8. The method according to claim 1, wherein said first image is displayed on said screen after said second image.

9. A computer system for displaying a plurality of images on a screen in a window environment under user control, comprising:

a screen for displaying said plurality of images; and a controllable processor programmed to determine a temporal order of each image according to creation or retrieval of said each image by said computer system, said controllable processor being programmed to display said plurality of images in said temporal order by arraying the displayed images along a line such that the sizes of the displayed images progressively change along said line in accordance with said temporal order, each of said images having a predetermined size and being manipulable by a predetermined number of processing operations including a graphical or text processing function available to said user to be performed on respective images, said controllable processor being further programmed to determine those processing operations that are made available to said user based on the size of each of said images and to provide said processing operations for use by said user in correspondence with the size of each of said images, wherein a first image in said plurality of images has less processing operations than a second image in said plurality, said second image having larger size than said first image.

10. The computer system according to claim 9, wherein said controllable processor is further programmed to make said first image size larger such that the number of processing operations available to be performed on said first image is increased in correspondence with the increase in said first image size.

11. The computer system according to claim 10, wherein making said first image size larger does not increase the number of processing operations available to be performed on said first image if the number of processing operations has reached a maximum value.

12. The computer system according to claim 9, wherein said controllable processor is further programmed to make said first image size smaller such that the number of processing operations available to be performed on said first image is reduced in correspondence with the decrease in said first image size.

13. The computer system according to claim 12, wherein making said first image size smaller does not reduce the number of processing operations available to be performed on said first image if the number of processing operations has reached a minimum value.

* * * * *